(12) United States Patent
Imata

(10) Patent No.: US 8,284,268 B2
(45) Date of Patent: Oct. 9, 2012

(54) IMAGING APPARATUS AND METHOD, INFORMATION PROCESSING APPARATUS AND METHOD, AND RECORDING MEDIUM STORING A PROGRAM THEREFOR

(75) Inventor: Masanori Imata, Kanagawa (JP)

(73) Assignee: Sony Corporation, Tokyo (JP)

( * ) Notice: Subject to any disclaimer, the term of this patent is extended or adjusted under 35 U.S.C. 154(b) by 371 days.

(21) Appl. No.: 12/268,533

(22) Filed: Nov. 11, 2008

(65) Prior Publication Data

US 2009/0135275 A1    May 28, 2009

(30) Foreign Application Priority Data

Nov. 28, 2007    (JP) ................................. 2007-306781

(51) Int. Cl.
*H04N 5/232*    (2006.01)
(52) U.S. Cl. ................. 348/211.8; 348/240.99
(58) Field of Classification Search ............... 348/207.1, 348/207.11, 208.4, 208.5, 208.6, 208.7, 211.99, 348/211.4, 211.6, 211.8, 211.9, 240.99, 240.1, 348/240.3, 211.13, 211.14, 240.2, 333.01, 348/333.11; 345/619, 660, 661, 662, 665
See application file for complete search history.

(56) References Cited

U.S. PATENT DOCUMENTS

| 4,982,345 | A | * | 1/1991 | Callahan et al. ............... 345/628 |
| 6,985,178 | B1 | | 1/2006 | Morita et al. |
| 7,197,718 | B1 | * | 3/2007 | Westerman et al. ........... 715/801 |
| 2001/0019355 | A1 | * | 9/2001 | Koyanagi et al. ................ 348/36 |
| 2001/0040636 | A1 | * | 11/2001 | Kato et al. ................ 348/333.03 |
| 2005/0036036 | A1 | * | 2/2005 | Stevenson et al. ........ 348/211.99 |
| 2005/0174362 | A1 | * | 8/2005 | Lee et al. ....................... 345/660 |

FOREIGN PATENT DOCUMENTS

| JP | 2004-271802 A | 9/2004 |
| JP | 2005-100388 A | 4/2005 |
| JP | 2005-286550 A | 10/2005 |
| WO | WO 95/11566 A | 4/1995 |

* cited by examiner

*Primary Examiner* — Aung S Moe
*Assistant Examiner* — Chriss Yoder, III
(74) *Attorney, Agent, or Firm* — Wolf, Greenfield & Sacks, P.C.

(57) ABSTRACT

An imaging apparatus acquires and displays an image of a subject such that a target subject remains displayed on a monitor even after performing an area zoom operation. An imaging unit acquires a subject image at a variable subject acquisition magnification and acquisition angle. A controller conducts an area zoom control such that, when a given area is specified as a sub-area of a predetermined image display region, the acquisition magnification and angle are modified to enlarge the given area. A limiting magnification is also set as the zoom magnification when the ratio of the dimensions of the predetermined display region with respect to the given area exceeds the limiting magnification. When the limiting magnification is not exceeded, the ratio of the dimensions is set as the zoom magnification.

17 Claims, 10 Drawing Sheets

IMAGING APPARATUS AND METHOD, INFORMATION PROCESSING APPARATUS AND METHOD, AND RECORDING MEDIUM STORING A PROGRAM THEREFOR

CROSS REFERENCES TO RELATED APPLICATIONS

The present invention contains subject matter related to Japanese Patent Application JP 2007-306781 filed in the Japanese Patent Office on Nov. 28, 2007, the entire contents of which are incorporated herein by reference.

BACKGROUND OF THE INVENTION

1. Field of the Invention

The present invention relates to an imaging apparatus and method, an information processing apparatus and method, and a recording medium storing a program therefor. More particularly, the present invention relates to an imaging apparatus and method, an information processing apparatus and method, and a program able to keep displaying a target subject on a monitor even after performing an area zoom operation.

2. Description of the Related Art

Using technology referred to as a network camera, it is possible to acquire a remote image over a network, and then cause that image to be displayed on a monitor. In addition, network cameras include a function referred to as area zoom, wherein a user performs a specifying operation by enclosing an arbitrary portion of the remote image displayed on the monitor with a rectangle, thereby causing a zoomed-in view of the enclosed portion of the remote image to be displayed on the monitor (see Japanese Unexamined Patent Application Publication No. 2004-271802, for example).

SUMMARY OF THE INVENTION

However, in network cameras of the related art, there is a problem in that an area zoom may result in a target subject being displaced out of the monitor's display region and thus no longer displayed.

The present invention, having been devised in light of the foregoing circumstances, is able to keep displaying a target subject on a monitor even after performing an area zoom operation.

An imaging apparatus in accordance with an embodiment of the present invention acquires an image of a subject, and is provided with an imaging unit and a controller. The imaging unit acquires an image of the subject at a variable subject acquisition magnification and acquisition angle. The controller conducts an area zoom control such that, when a given area is specified as a sub-area of a predetermined display region displaying the imaged result from the imaging unit, the acquisition magnification and the acquisition angle of the imaging unit are modified so as to cause the image in the given area to be enlarged to the size of the predetermined display region and then displayed. The modified acquisition magnification resulting from the area zoom control is the magnification obtained as a result of multiplying the pre-modification acquisition magnification by the relative zoom magnification. Furthermore, when the ratio of the dimensions of the predetermined display region with respect to the given area is larger than a limiting magnification, then the limiting magnification is adopted as the zoom magnification. When the ratio of the dimensions of the predetermined display region with respect to the given area is smaller than the limiting magnification, then the ratio of the dimensions is adopted as the zoom magnification.

An imaging method in accordance with an embodiment of the present invention corresponds to the above imaging apparatus in accordance with an embodiment of the present invention.

Using the imaging apparatus and method in accordance with embodiments of the present invention, an area zoom control is conducted by means of an imaging apparatus provided with an imaging unit that acquires an image of a subject at a variable subject acquisition magnification and acquisition angle. The area zoom control is configured such that, when a given area is specified as a sub-area of a predetermined display region displaying the imaged result from the imaging unit, the acquisition magnification and the acquisition angle of the imaging unit are modified so as to cause the image in the given area to be enlarged to the size of the predetermined display region and then displayed. In the area zoom control, the modified acquisition magnification resulting from the area zoom control is the magnification obtained as a result of multiplying the pre-modification acquisition magnification by the relative zoom magnification. Furthermore, when the ratio of the dimensions of the predetermined display region with respect to the given area is larger than a limiting magnification, then the limiting magnification is adopted as the zoom magnification. When the ratio of the dimensions of the predetermined display region with respect to the given area is smaller than the limiting magnification, then the ratio of the dimensions is adopted as the zoom magnification.

An information processing apparatus in accordance with an embodiment of the present invention controls an imaging apparatus that acquires an image of a subject with a variable acquisition magnification and acquisition angle. The information processing apparatus is provided with a controller that conducts an area zoom control such that, when a given area is specified as a sub-area of a predetermined display region displaying the imaged result from the imaging apparatus, the acquisition magnification and the acquisition angle of the imaging apparatus are modified so as to cause the image in the given area to be enlarged to the size of the predetermined display region and then displayed. The modified acquisition magnification resulting from the area zoom control is the magnification obtained as a result of multiplying the pre-modification acquisition magnification by the relative zoom magnification. Furthermore, the controller is configured such that, when the ratio of the dimensions of the predetermined display region with respect to the given area is larger than a limiting magnification, then the limiting magnification is adopted as the zoom magnification. When the ratio of the dimensions of the predetermined display region with respect to the given area is smaller than the limiting magnification, then the ratio of the dimensions is adopted as the zoom magnification.

An information processing method and recording medium storing a program in accordance with embodiments of the present invention are for use with the above information processing apparatus in accordance with an embodiment of the present invention.

Using the information processing apparatus and method as well as the recording medium storing a program in accordance with embodiments of the present invention, an area zoom control is conducted with respect to an imaging apparatus that acquires an image of a subject at a variable subject acquisition magnification and acquisition angle. The area zoom control is configured such that, when a given area is specified as a sub-area of a predetermined display region displaying the imaged result from the imaging apparatus, the acquisition magnification and the acquisition angle of the imaging apparatus are modified so as to cause the image in the given area to be enlarged to the size of the predetermined display region and then displayed. In the area zoom control, the modified acquisition magnification resulting from the area zoom control is the magnification obtained as a result of multiplying the pre-modification acquisition magnification by the relative zoom magnification. Furthermore, when the ratio of the dimensions of the predetermined display region with respect to the given area is larger than a limiting magnification, then the limiting magnification is adopted as the zoom magnification. When the ratio of the dimensions of the predetermined display region with respect to the given area is smaller than the limiting magnification, then the ratio of the dimensions is adopted as the zoom magnification.

As described above, an area zoom control is realized according to an embodiment of the present invention. More particularly, a target subject continues to be displayed on a monitor even after performing an area zoom operation.

DESCRIPTION OF THE PREFERRED EMBODIMENTS

Hereinafter, embodiments of the present invention will be described with reference to the accompanying drawings.

Figure 1:
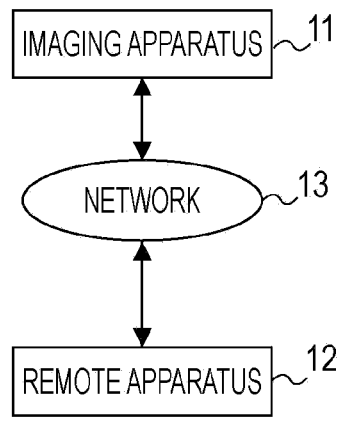
FIG. 1 is a block diagram illustrating an exemplary configuration of an information processing system to which the present invention has been applied.

FIG. 1 illustrates an exemplary configuration of an information processing system to which the present invention has been applied.

In the information processing system shown by way of example in FIG. 1, an imaging apparatus 11 and a remote apparatus 12 are mutually connected via a network 13.

The imaging apparatus 11 is remotely operated by the remote apparatus 12 via the network 13. In other words, the imaging apparatus 11 is configured to operate as a network camera.

Hereinafter, an exemplary configuration of the imaging apparatus 11 and an exemplary configuration of the remote apparatus 12 will be separately described in the above order and with reference to FIGS. 2 and 3, respectively. In addition, although the network 13 is not particularly limited, in the present embodiment the network 13 is taken to be an Ethernet® network by way of example.

Figure 2:
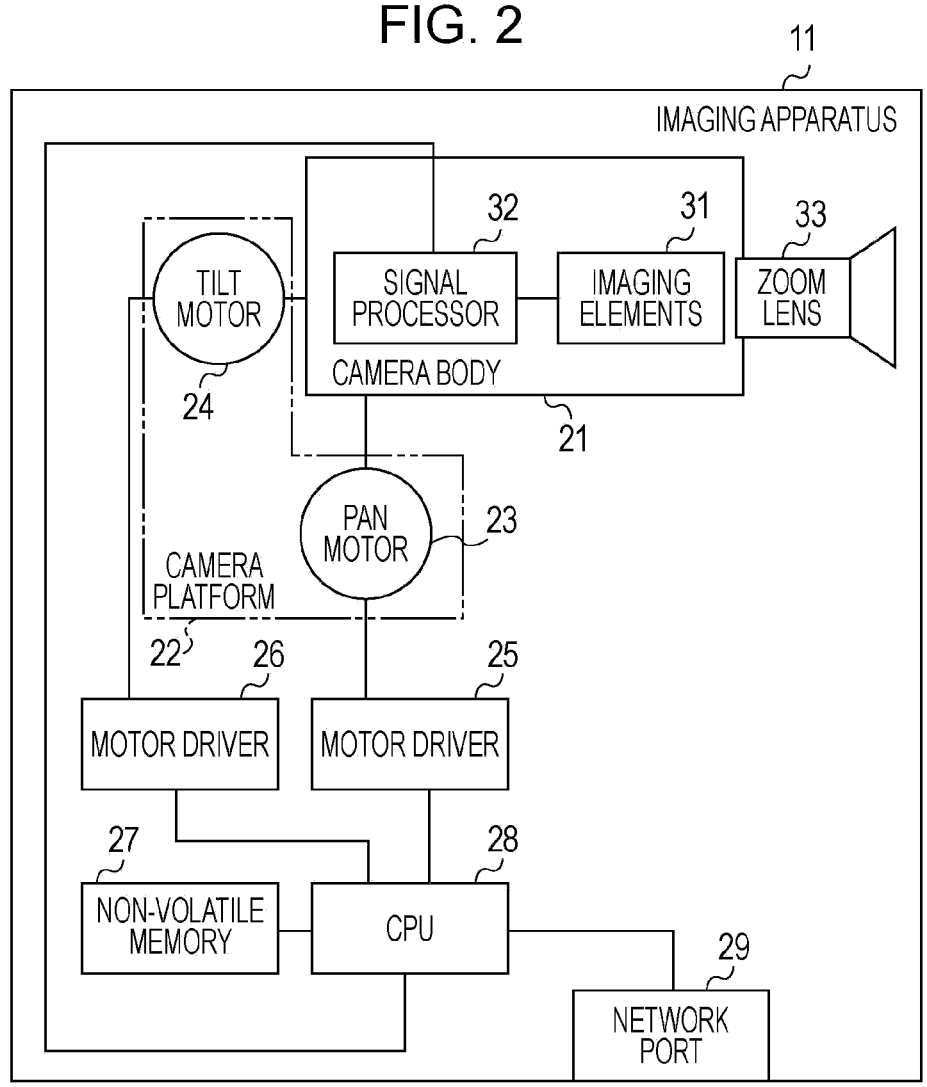
FIG. 2 is a block diagram illustrating an exemplary configuration of the imaging apparatus shown in FIG. 1.

FIG. 2 illustrates an exemplary configuration of the imaging apparatus 11.

The imaging apparatus 11 is configured to include a camera main body 21, a camera platform 22, a pan motor 23, a tilt motor 24, motor drivers 25 and 26, non-volatile memory 27, a CPU (central processing unit) 28, and a network port 29.

The camera main body 21 is configured to include imaging elements 31, a signal processor 32, and a zoom lens 33.

The imaging elements 31 are configured as an image sensor using CCD (charge-coupled device) or CMOS (complementary metal oxide semiconductor) sensors, for example. The imaging elements 31 acquire an image of a subject within the range of a predetermined read region, and then provide the imaged result to the signal processor 32 as an electrical image signal.

The signal processor 32 executes various signal processing on the basis of control by the CPU 28. For example, the signal processor 32 may receive an image signal provided by the imaging elements 31, appropriately perform operations such as A/D conversion and image processing with respect to the image signal, and then provide the results to the CPU 28. In addition, in response to instructions from the CPU 28, the signal processor 32 also executes control processing to adjust the acquisition magnification of the zoom lens 33.

The zoom lens 33 is an optical unit attached to the camera main body 21, and is adjusted to a given acquisition magnification according to instructions from the signal processor 32. The acquisition magnification of the zoom lens 33 is continuously adjustable from a wide-angle position to a telephoto position.

The camera platform 22 is a rotating platform that causes the camera main body 21 to rotate, and is used to adjust the direction of image acquisition by the camera main body 21. In order to realize the above functions, a pan motor 23 for adjusting the horizontal angle of the camera main body 21 as well as a tilt motor 24 for adjusting the vertical angle of the camera main body 21 are mounted in the camera platform 22. Hereinafter, the combined angle resulting from the combination of a horizontal angle and a vertical angle of the camera main body 21 will be referred to as the acquisition angle. The pan motor 23 and the tilt motor 24 are respectively controlled by separate motor drivers 25 and 26. In other words, the motor drivers 25 and 26 control the rotational angles of the pan motor 23 and the tilt motor 24 in accordance with an acquisition angle issued from the CPU 28.

The non-volatile memory 27 stores information such as data and programs executed by the CPU 28. For example, the non-volatile memory 27 may store a variety of parameters used in various control processing operations executed by the CPU 28. As a more specific example, in the present embodiment, the non-volatile memory 27 stores data indicating the distance by which the optical axis of the zoom lens 33 is displaced from the center of the imaging area (i.e., the acquisition region) of the imaging elements 31. The above data is used by the CPU 28 in computations performed in order to compensate for such displacement. These computations will be described later in further detail.

The CPU 28 executes various control processing operations by following a program stored in the non-volatile memory 27, or by following remote operation instructions issued from the remote apparatus 12 via the network 13.

For example, the CPU 28 may control the motor drivers 25 and 26 for the pan motor 23 and the tilt motor 24, while also executing various processing, such as compressing and encoding the image signal provided by the camera main body 21. In addition, the CPU 28 may conduct a control to transmit a processed image signal that has been compressed and encoded to the remote apparatus 12 via the network 13 connected to the network port 29.

The network port 29 is connected to a LAN (local area network) or similar network 13. As a result, the imaging apparatus 11 is connected to the remote apparatus 12 via the network 13, and thereby functions as a network camera.

Figure 3:
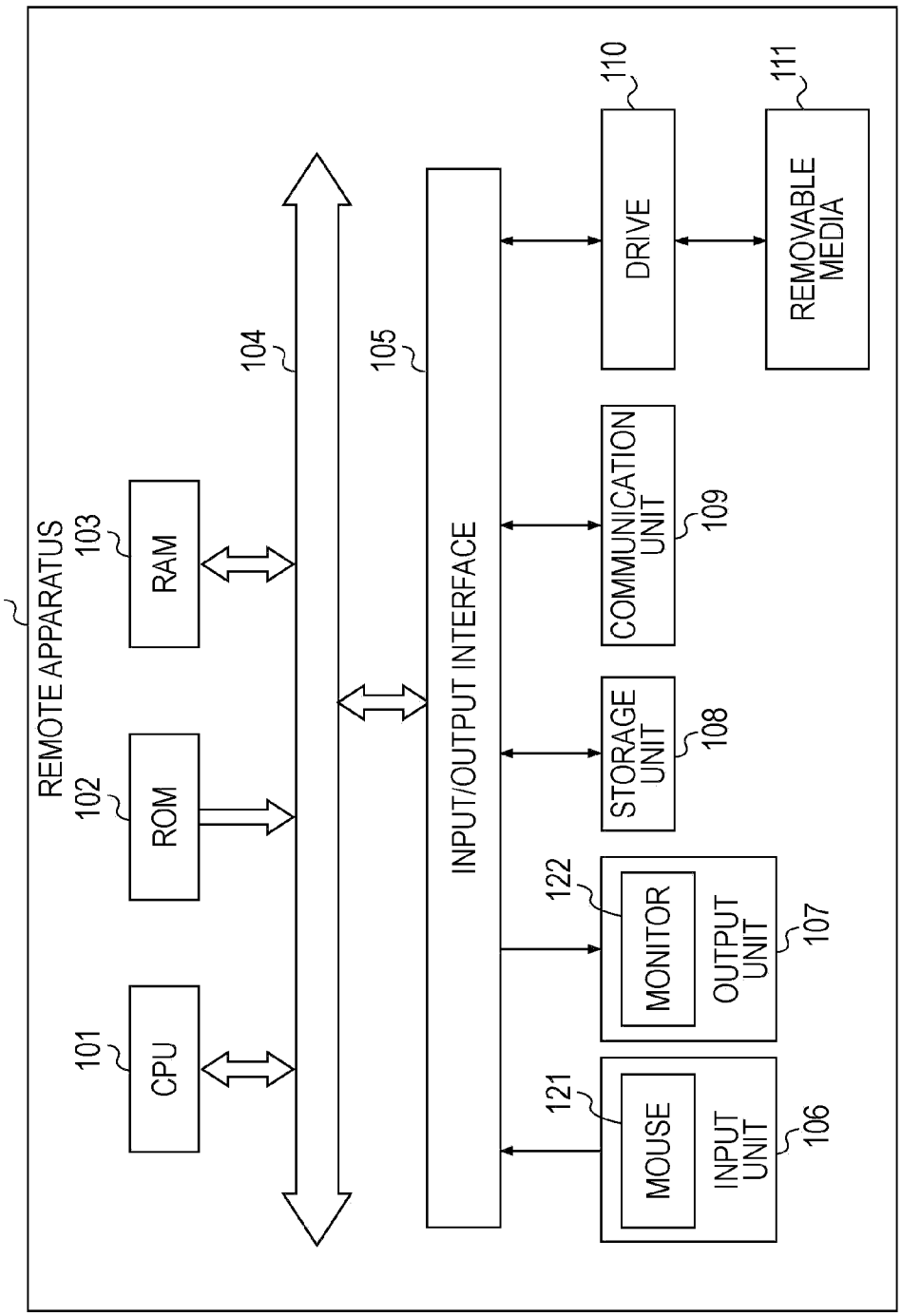
FIG. 3 is a block diagram illustrating an exemplary configuration of the remote apparatus shown in FIG. 1.

FIG. 3 illustrates an exemplary configuration of the remote apparatus 12.

In FIG. 3, the CPU 101 executes various processing operations by following a program stored in the ROM 102 or the storage unit 108. The RAM 103 stores information such as data and programs executed by the CPU 101. The CPU 101, ROM 102, and RAM 103 are mutually connected by a bus 104.

The CPU 101 is additionally connected to an input/output interface 105 via the bus 104. The input/output interface 105 is connected to an input unit 106 (including devices such as a keyboard, a mouse 121, and microphone), as well as to an output unit 107 (including devices such as a monitor 122 and one or more speakers). The CPU 101 executes various processing operations in response to command received as input from the input unit 106. The CPU 101 then outputs the processing results to the output unit 107.

The storage unit 108 connected to the input/output interface 105 is a hard disk, for example, and stores various data and programs executed by the CPU 101.

The communications unit 109 communicates with an external device (i.e., the imaging apparatus 11 in the present embodiment, for example) via a network such as the Internet or a local area network (i.e., the network 13 in the present embodiment, for example). In addition, the communications unit 109 may also acquire a program via the network and then cause the acquired program to be stored in the storage unit 108.

The drive 110 connected to the input/output interface 105 drives removable media 111 loaded thereinto, thereby acquiring information such as programs or data recorded on the removable media 111. The removable media 111 may be a magnetic disk, an optical disc, a magneto-optical disk, or semiconductor memory, for example. The acquired information programs or data are then forwarded to and stored in the storage unit 108 as appropriate.

Exemplary operation of the remote apparatus 12 will now be described.

The CPU 101 first runs given browser software (i.e., a type of program) and conducts a control that causes information to be displayed on the monitor 122. Subsequently, the CPU 101 conducts a control that causes an image acquired by the imaging apparatus 11 to be shown in the display region of the browser software. More specifically, the imaging apparatus 11 first takes an image acquired by the camera main body 21, converts the image into a data format that can be displayed by the browser software on the remote apparatus 12, and then transmits the converted image data to the remote apparatus 12 via the network 13. The remote apparatus 12 receives image data in the above data format via the network 13. The CPU 101 of the remote apparatus 12 then interprets the received image data using the browser software, and subsequently causes the monitor 122 to display a corresponding image.

In addition, the browser software is also provided with a control region for receiving commands for controlling the imaging apparatus 11 (such as arrows or similar software buttons that are displayed in the browser software, for example). It is thus possible to acquire images at a desired camera angle and magnification as a result of the user operating the control region using an input device such as the mouse 121. The camera angle herein refers to the acquisition angle described with respect to the imaging apparatus 11, while the magnification herein refers to the acquisition magnification of the zoom lens 33 described with respect to the imaging apparatus 11.

It should be appreciated that it is also possible to adopt an input device other than the mouse 121, such as a touch panel provided with the monitor 122, or a pen tablet.

For example, the user may select software buttons in the control region of the browser software by operating the mouse 121 or similar device, and thereby issue instructions for a left/right pan operation. In this case, the CPU 101 transmits the above instructions to the imaging apparatus 11 via the communications unit 109 and the network 13. Subsequently, the imaging apparatus 11 receives the instructions via the network port 29, interprets and converts the instructions into, for example, a rotational angle for the pan motor 23, and then issues the converted instructions to the motor driver 25. In so doing, the pan motor 23 rotates by an amount equal to the given angle, and as a result, a pan operation of the camera main body 21 is realized.

As another example, the user may select software buttons in the control region of the browser software by operating the mouse 121 or similar device, and thereby issue instructions for an up/down tilt operation. In this case, the CPU 101 transmits the above instructions to the imaging apparatus 11 via the communications unit 109 and the network 13. Subsequently, the imaging apparatus 11 receives the instructions via the network port 29, interprets and converts the instructions into, for example, a rotational angle for the tilt motor 24, and then issues the converted instructions to the motor driver 26. In so doing, the tilt motor 24 rotates by an amount equal to the given angle, and as a result, a tilt operation of the camera main body 21 is realized.

As another example, the user may select software buttons in the control region of the browser software by operating the mouse 121 or similar device, and thereby issue instructions for a zoom operation. In this case, the CPU 101 transmits the above instructions to the imaging apparatus 11 via the communications unit 109 and the network 13. Subsequently, the imaging apparatus 11 receives the instructions via the network port 29, interprets the instructions, and then conducts a control to drive the zoom motor (not shown in the drawings) of the zoom lens 33. As a result, a zoom operation is realized. In other words, adjustment of the acquisition magnification of the zoom lens 33 is realized as a result of the above.

In addition, in the present embodiment, there is also included an area zoom function. More specifically, there is a function whereby a given area (i.e., a rectangular region) is specified by the mouse 121 or similar device as a sub-area of an image displayed in the display region of the browser software, and as result, the acquisition angle and/or acquisition magnification are adjusted such that the given area is enlarged to the size of the entire display region and subsequently displayed.

More specifically, when the user operates the mouse 121 or similar device so as to specify a desired area as a sub-area of the display region in the browser software, the CPU 101 issues information specifying the center and size of the area to the imaging apparatus 11 via the communications unit 109 and the network 13. Subsequently, the imaging apparatus 11 receives the above information via the network port 29, and on the basis of the issued center and size of the area, computes an acquisition angle for the camera main body 21 and an acquisition magnification for the zoom lens 33. A specific example of the computational technique for the above will be described later. Subsequently, as described above, the CPU 101 controls pan, tilt, and zoom operations as appropriate. As a result, the part of the image within the specified area is enlarged to the size of the entire display region of the browser software, and then displayed therein at the remote apparatus 12. In this way, by simply specifying an area centered on a target object, the user is able to immediately view an image that is zoomed in to and centered on the object.

Next, the operation of the imaging apparatus 11 will be described.

Figure 4:
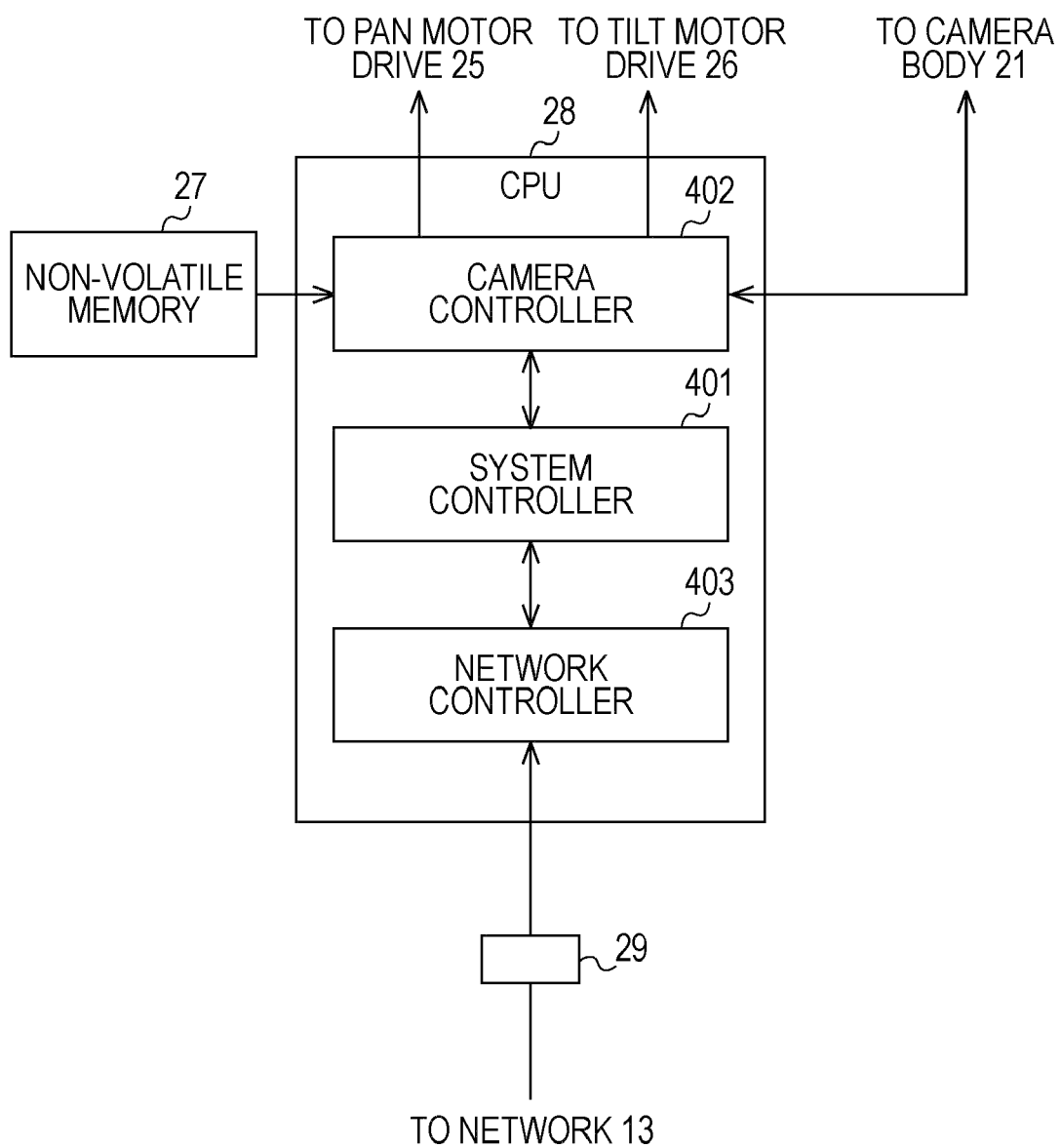
FIG. 4 is a functional block diagram illustrating an exemplary functional configuration of the imaging apparatus shown in FIG. 2.

FIG. 4 shows functional blocks for realizing a subset of the various functions included in the CPU 28, the subset of functions being used to execute the operations to be hereinafter described. More specifically, a system controller 401, a camera controller 402, and a network controller 403 are provided in the CPU 28 as the above functional blocks.

The system controller 401 conducts general system control of the imaging apparatus 11.

The camera controller 402 computes various control values used to control the camera main body 21. For example, the camera controller 402 may compute control values issued to the motor drivers 25 and 26 in order to adjust the acquisition angle of an image acquired by the camera main body 21. As an another example, the camera controller 402 may compute control values issued to the zoom motor (not shown in the drawings) in order to adjust the acquisition magnification of the zoom lens 33. In addition, the camera controller 402 acquires an image signal provided by the signal processor 32 of the camera main body 21, and subsequently provides the image signal to the network controller 403 via the system controller 401.

The network controller 403 conducts negotiation and other communications control in order to connect to the network 13 via the network port 29.

The imaging-related operation of the imaging apparatus 11 will now be described.

In the present embodiment, on the basis of computations conducted by the camera controller 402, the acquisition angle of the camera main body 21 is adjusted, the acquisition magnification of the zoom lens 33 is adjusted, and then imaging is subsequently conducted.

More specifically, the acquisition magnification is first adjusted by the zoom lens 33 and the acquisition angle is adjusted by the camera platform 22 in order to acquire an image using the imaging elements 31. When making the above adjustments, the CPU 28 computes compensation values for a given acquisition magnification and a given acquisition angle using displacement data stored in the non-volatile memory 27 in advance. The displacement data indicates the distance by which the optical axis of the zoom lens 33 is displaced from the center of the read region of the imaging elements 31 (hereinafter, the above distance will be referred to as the displacement from the optical axis center). Subsequently, the CPU 28 controls the angle of the camera platform 22 on the basis of the compensation values such that the displacement is compensated for and eliminated.

In the present embodiment, in order to calculate the above compensation values, the displacement of the optical axis of the zoom lens 33 with respect to the center of the read region of the imaging elements 31 may be measured in advance, with data indicating the measured results (i.e., displacement data) being stored in the non-volatile memory 27 for later use, for example. More precisely, the displacement data stored in the non-volatile memory 27 does not indicate the displacement with respect to the optical axis center, but rather with respect to the display position at the remote apparatus 12, as described hereinafter.

Displacement with respect to the optical axis center will now be described with reference to FIGS. 5 and 6.

Figure 5:
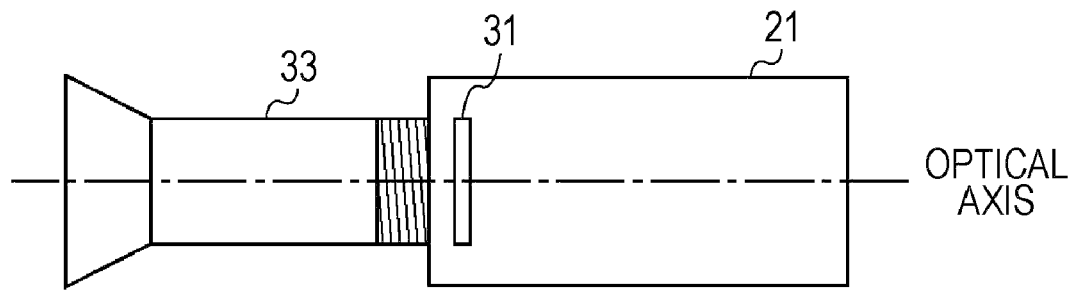
FIG. 5 is a diagram for explaining displacement from the center of the optical axis.

As shown in FIG. 5, imaging elements 31 such as CCD sensors are built into the camera main body 21. The center position of the imaging elements 31 (i.e., the center of the read region) is determined by alignment with the optical axis set within the chassis of the camera main body 21. The center position of the zoom lens 33 is also determined by alignment with the optical axis.

Consequently, in the ideal case, the optical axis passes through both the center of the read region of the imaging elements 31 as well as the center of the zoom lens 33, as shown in FIG. 5.

In practice, however, positioning errors may occur during assembly of the imaging elements 31 and the zoom lens 33, and thus displacement may also occur with respect to the optical axis center. Due to such center displacement from the optical axis, there also occurs displacement with respect to the display position of the remote apparatus 12.

Figure 6:
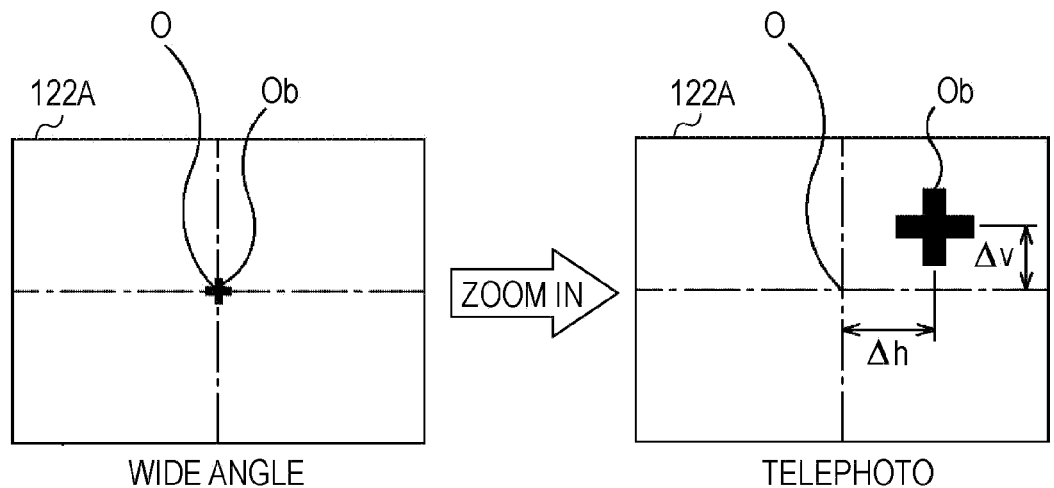
FIG. 6 is a diagram for explaining displacement from the center of the optical axis.

For example, the leftmost portion of FIG. 6 illustrates the display state of a screen 122A, in the case where the zoom lens 33 has been set to the wide-angle position, and the acquisition angle for images acquired by the camera main body 21 has been adjusted such that a given target object Ob is positioned in the center of the screen 122A. It should be appreciated that in the present embodiment, the screen 122A is taken to mean the display region of the browser software shown on the monitor 122 of the remote apparatus 12. Starting from the display state shown in the leftmost portion of FIG. 6, if a zoom-in operation is subsequently conducted to raise the acquisition magnification of the zoom lens 33, then the display state of the screen 122A transitions to the state shown in the rightmost portion of FIG. 6. More specifically, although the target object Ob was displayed in the center of the screen 122A in the wide-angle position, in the telephoto position there occurs a phenomenon whereby the display position of the target object Ob becomes displaced from the center O of the screen 122A. More specifically, there occurs a phenomenon whereby the display position of the target object Ob becomes displaced from the center O of the screen 122A by an amount Δh in the horizontal direction and an amount Δv in the vertical direction. One of the factors contributing to this displacement in the display position is the displacement with respect to the optical axis center, as described above.

Consequently, in the present embodiment, the displacement of the display position may be measured in advance, with the measured results being stored as displacement data in the non-volatile memory 27 for later use, for example. Subsequently, the CPU 28 uses the above displacement data to compute compensation values that are in turn used to control the angle of the camera platform 22. In other words, the displacement data is used to compute compensation values for compensating and eliminating the displacement with respect to the optical axis center.

Figure 7:
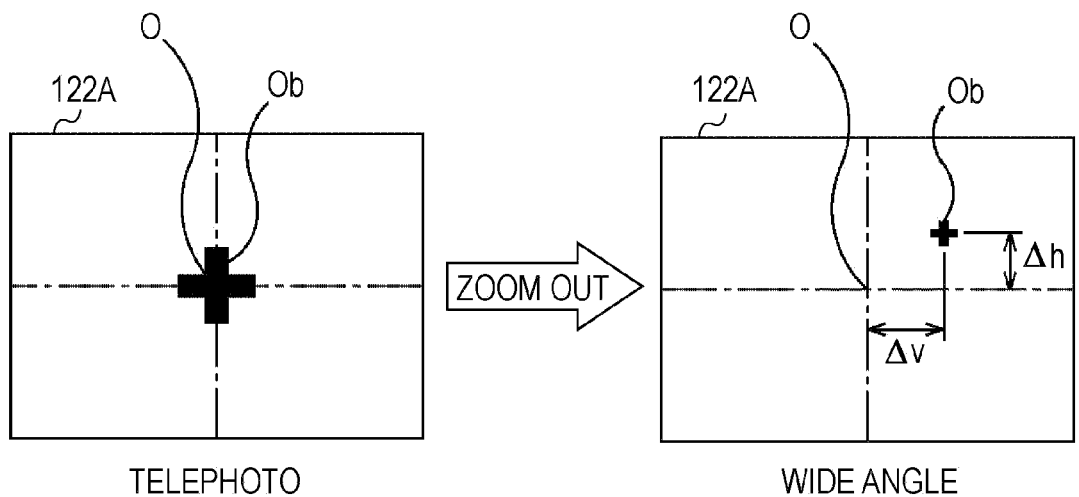
FIG. 7 is a schematic diagram for explaining a technique for measuring displacement from the center of the optical axis.

FIG. 7 is a schematic diagram for explaining a technique for measuring displacement from the optical axis center, or more precisely, the displacement of the display position due to displacement from the optical axis center.

First, the user operates the remote apparatus 12, setting the zoom lens 33 to the telephoto position and adjusting the acquisition angle for images acquired by the camera main body 21 such that a desired target object Ob is displayed in the center O of the screen 122A, as shown in the leftmost portion of FIG. 7.

Next, the user operates the remote apparatus 12 so as to set the zoom lens 33 to the wide-angle position, as shown in the rightmost portion of FIG. 7. Although the display position of the target object Ob was aligned with the center O of the screen 122A before conducting the above operation, the display position of the target object Ob may become displaced from the center O of the screen 122A after the above operation. In this case, the remote apparatus 12 respectively measures the amount of horizontal displacement Δh and the amount of vertical displacement Δv with respect to the screen center O. The remote apparatus 12 then issues the measured results to the imaging apparatus 11 via the network 13. The imaging apparatus 11 subsequently stores the measured results as displacement data in the non-volatile memory 27.

A technique for using the above displacement data to compute compensation values (i.e., compensation values used to control the angle of the camera platform 22) will now be described.

The CPU 28 of the imaging apparatus 11 (more specifically, the camera controller 402 therein) first reads displacement data from the non-volatile memory 27, and subsequently uses the displacement data to compute compensation values in a manner like that described below by way of example.

However, for the sake of convenience in the following description, the compensation values adopted herein are values that have been converted to position values with respect to the screen 122A on the monitor 122 of the remote apparatus 12.

First, the camera controller 402 computes the error according to the following Eq. 1 in the case where a given acquisition magnification and a given acquisition angle have been configured.

$$\Delta x = \Delta h(n_1 - n_0)/(N_t - N_w)$$

$$\Delta y = \Delta v(n_1 - n_0)/(N_t - N_w) \quad (1)$$

In Eq. 1, Δx represents the horizontal error that is actually applied, while Δy represents the vertical error that is actually applied. Δh represents the horizontal displacement quantity contained in the displacement data read from the non-volatile memory 27. Δv represents the vertical displacement quantity contained in the displacement data read from the non-volatile memory 27. In addition, $n_0$ represents the current acquisition magnification (i.e., lens magnification), $n_1$ represents the desired acquisition magnification (i.e., lens magnification), $N_t$ represents the acquisition magnification (i.e., lens magnification) at the telephoto position, and $N_w$ represents the acquisition magnification (i.e., lens magnification) at the wide-angle position.

The displacement quantities Δh and Δv acquired in advance indicate the amount of displacement between the wide-angle and telephoto positions. Thus, the computation according to the above Eq. 1 converts the above horizontal displacement quantity Δh and vertical displacement quantity Δv into respective displacement quantities occurring when the lens magnification is actually modified. In other words, the computation according to Eq. 1 respectively converts Δh and Δv into a horizontal error Δx and a vertical error Δy that are applied in actual operation.

Using the values for the horizontal error Δx and the vertical error Δy that result from computation according to Eq. 1, the camera controller 402 compensates the angle control of the camera platform 22. More specifically, the camera controller 402 compensates the operating angles of the pan motor 23 and the tilt motor 24. In other words, the values for the horizontal error Δx and the vertical error Δy that result from computation according to Eq. 1 are compensation values used to control the angle of the camera platform 22. As a result of such compensation, it becomes possible to offset and eliminate the displacement in the display position of the screen 122A due to displacement from the optical axis center.

Hereinafter, a specific example of the angle control for the camera platform 22 will be described for the case wherein the above area zoom function is utilized.

Figure 8:
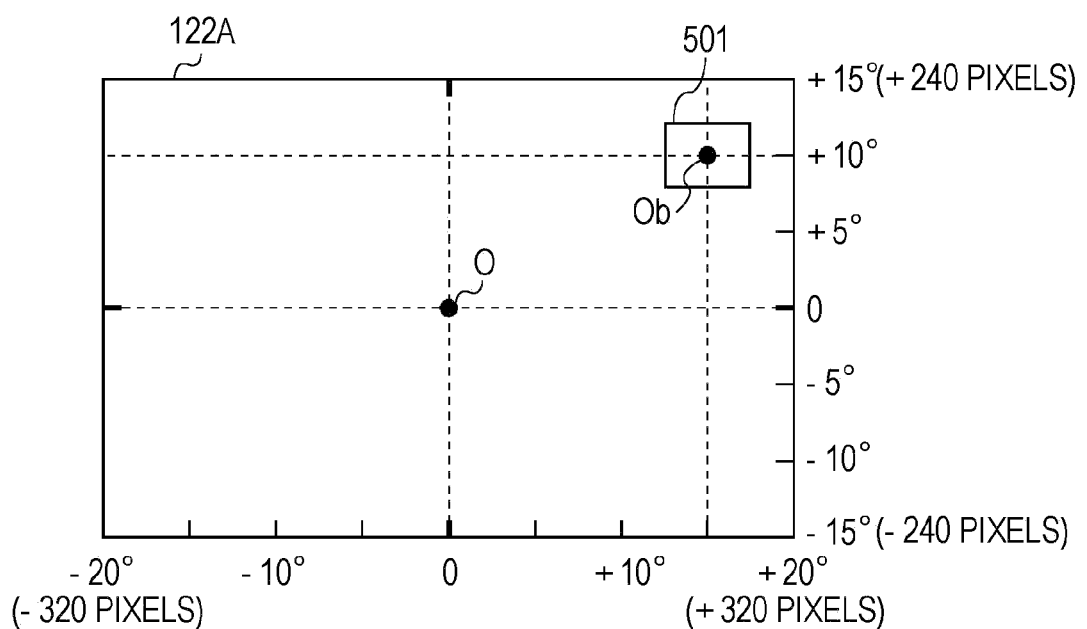
FIG. 8 is a diagram for explaining the area zoom function.

FIG. 8 is a schematic diagram for explaining the area zoom function.

In the example shown in FIG. 8, the screen 122A is 640 pixels in the horizontal direction and 480 pixels in the vertical direction. In other words, the screen size is 640×480 (horizontal pixels versus vertical pixels). In addition, a coordinate system is defined having units of 1 pixel and taking the center O of the screen 122A as the origin. Coordinates expressed in this coordinate system are used to conduct the various computations given below. Furthermore, the angular field of view of a camera main body 21 compatible with the above screen size is taken to be ±20° in the horizontal direction and ±15° in the vertical direction.

In the example shown in FIG. 8, the imaging apparatus 11 computes an acquisition magnification (i.e., a zoom magnification) and an acquisition angle (i.e., a combination of a pan angle and a tilt angle for the camera platform 22) on the basis of an area zoom frame 501 specified by the user. By controlling the zoom lens 33 of the camera main body 21 and the camera platform 22 according to the computed values, the part of the image inside the area zoom frame 501 is enlarged to the size of the entire screen 122A, thereby realizing an area zoom function. Hereinafter, the above process of enlarging the part of the image inside the area zoom frame 501 to the size of the entire screen 122A will be referred to as an area zoom.

The area zoom frame 501 is a rectangular region specified as a result of the user performing an operation using the mouse 121 or similar device. In the case where the dimensions of the specified area zoom frame 501 differ from the aspect ratio of the screen (i.e., the case wherein the area zoom frame 501 is geometrically dissimilar to the screen 122A), either the vertical or the horizontal size of the area zoom frame 501 is used as a reference, and the size of the area zoom frame 501 is then adjusted to match the aspect ratio of the screen. This adjustment may be conducted by means of processing within the remote apparatus 12, such that the results of such adjustment are not reflected in the area zoom frame 501 displayed on the screen 122A. However, the opposite may also be performed. In other words, the adjustment processing may be configured such that the results of such adjustment are directly reflected in the area zoom frame 501 displayed on the screen 122A.

In addition, the size of the area zoom frame 501 may be adjusted to match the aspect ratio of the screen within the imaging apparatus 11, without performing adjustment within the remote apparatus 12.

In addition, instead of a rectangular region, the area zoom frame 501 may also be a circular region or a region enclosed by a user-drawn frame. In cases such as the above, the area zoom frame 501 may be adjusted such that the minimum area containing the area zoom frame 501 and geometrically similar to the screen 122A is specified.

The exemplary area zoom frame 501 shown in FIG. 8 is centered about the position (240, 160) of a target object Ob, and has a size of 80 pixels in the horizontal direction and 60 pixels in the vertical direction. In other words, as a result of the user specifying a center position and size like the above, the exemplary area zoom frame 501 shown in FIG. 8 is displayed.

At this point, the angular field of view of the camera is 40° (±20°) in the horizontal direction, and 30° (±15°) in the vertical direction, as described above. For this reason, in order to enlarge the portion enclosed by the area zoom frame 501 to the size of the entire screen 122A, the camera main body 21 may be rotated 15° to the right and 10° upwards. In addition, the zoom magnification may be set to an 8× zoom.

Stated more generally, if the pan angle is represented by $\theta_p$, the tilt angle is represented by $\theta_t$, and the zoom magnification (i.e., the post-area zoom acquisition magnification) is represented by $n_1$, then the pan angle $\theta_p$, the tilt angle $\theta_t$, and the zoom magnification $n_1$ are respectively computed according to the following Eqs. 2 to 4.

$$\theta_p = \text{(horizontal angle of screen area/horizontal size of screen area)} \times \text{horizontal center position of area zoom frame} \quad (2)$$

$$\theta_t = \text{(vertical angle of screen area/vertical size of screen area)} \times \text{vertical center position of area zoom frame} \quad (3)$$

$$n_1 = \text{(horizontal size of screen area/horizontal size of area zoom frame)} \times \text{current lens magnification} \quad (4)$$

However, if the angle of the camera platform 22 is controlled using the pan angle $\theta_p$, the tilt angle $\theta_t$, and the zoom magnification $n_1$ computed according to the above Eqs. 2 to 4, then potentially the target object Ob may not be displayed in the center O of the screen when the image in the area zoom frame 501 is enlarged to the size of the entire screen 122A and displayed, due to displacement from the optical axis center as described above.

Figure 9:
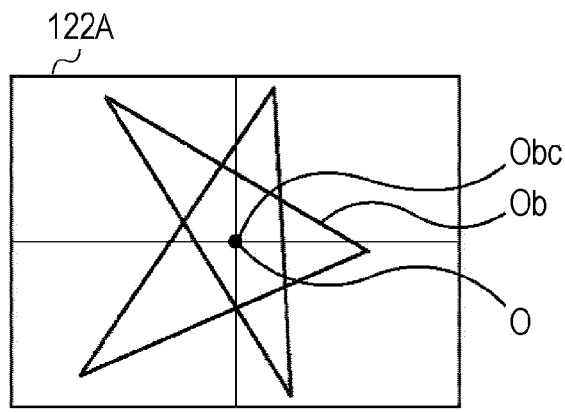
FIG. 9 illustrates an exemplary display image displayed after performing an ideal area zoom operation.

As a specific example, when the image in the area zoom frame 501 is enlarged to the size of the entire screen 122A, the display state ideally becomes like that illustrated in FIG. 9. More specifically, the system ideally zooms in on and displays a target object Ob such that the center $Ob_c$ of the target object Ob is aligned with the center O of the screen 122A.

Figure 10:
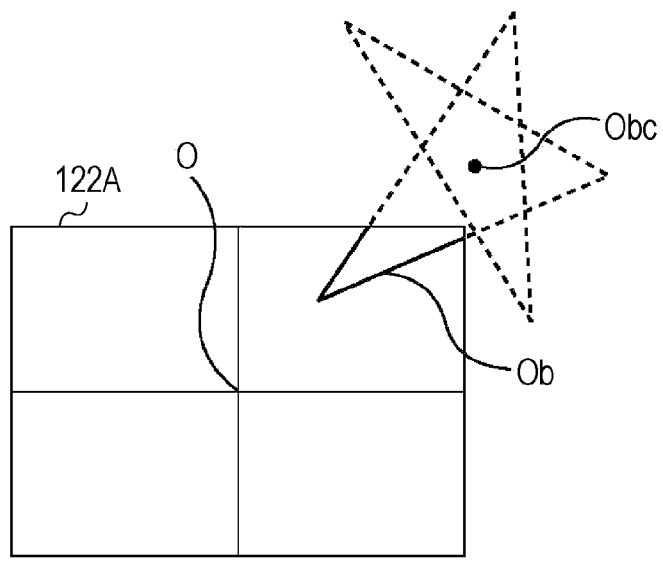
FIG. 10 illustrates an exemplary display image displayed after an area zoom operation, in the case where an off-center object display occurs as a result of the area zoom.

However, since displacement from the optical axis center exists as described earlier, in practice the display state does not become like that shown in FIG. 9 when the area zoom frame 501 is enlarged to the size of the entire screen 122A and displayed. Instead, the display state becomes like that shown in FIG. 10. More specifically, a portion of the target object Ob is often left out of the screen 122A, and as a result, only the remaining portion is zoomed in on and displayed at the edge of the screen 122A (i.e., the upper-right edge in the example shown in FIG. 10). In such cases, in order to cause the target object Ob to be displayed in the center of the screen 122A (i.e., in order to change the display state from that shown in FIG. 10 to that shown in FIG. 9), the user subsequently performs difficult work to further operate the remote apparatus 12 and make fine adjustments to the acquisition angle of the camera main body 21. Furthermore, although a portion of the target object Ob is displayed on the screen 122A in the example shown in FIG. 10, in some cases the entire target object Ob may be completely left out of the screen 122A. In such cases, the work to re-adjust the remote apparatus 12 becomes highly difficult.

Consequently, the present embodiment is configured such that the angle of the camera platform 22 is controlled using a pan angle $\theta_p$ and a tilt angle $\theta_t$ computed according to the following Eqs. 5 and 6, for example, instead of the above Eqs. 2 and 3.

$$\theta_p = \text{(horizontal angle of screen area/horizontal size of screen area)} \times \text{(horizontal center position of area zoom frame} - \Delta x) \quad (5)$$

$$\theta_t = \text{(vertical angle of screen area/vertical size of screen area)} \times \text{(vertical center position of area zoom frame} - \Delta y) \quad (6)$$

Herein, the quantity $\Delta x$ in Eq. 5 (i.e., the actual horizontal error $\Delta x$) and the quantity $\Delta y$ in Eq. 6 (i.e., the actual vertical error $\Delta y$) are solved for using the above Eq. 1. More specifically, the values for the horizontal error $\Delta x$ and the vertical error $\Delta y$ that result from computation according to Eq. 1 are used to suitably compensate the pan angle $\theta_p$ and the tilt angle $\theta_t$. By using a compensated pan angle $\theta_p$ and tilt angle $\theta_t$ as well as the zoom magnification $n_1$ from Eq. 5 to control the angle of the camera platform 22, the displacement of the display position of the screen 122A due to displacement from the optical axis center can be offset and eliminated.

However, it is preferable to give further consideration to the phenomenon described above with reference to FIGS. 9 and 10, wherein, when the image in the area zoom frame 501 is enlarged to the size of the entire screen 122A and displayed, a target object Ob is displayed with the center $Ob_c$ thereof displaced from the center O of the screen 122A. In other words, the above phenomenon results in the center of the area zoom frame 501 being displaced upon performing an area zoom (to be hereinafter referred as the area zoom off-center display phenomenon). The cause of the above phenomenon is not limited to just the displacement from the optical axis center described earlier, but is rather the result of the compound interaction of a variety of factors such as the following. In other words, if displacement from the optical axis center is taken to be the first factor contributing to the area zoom off-center display phenomenon, then the remaining causes can be categorized into the following second through sixth factors.

The second factor is lens view angle error in the camera main body 21, or in other words, the difference between the nominal and the actual values for the angular field of view. For example, while the user may assume that a range of 40°×30° is being displayed on the screen 122A, the actual range may be a range such as 41°×29°.

The third factor is optical distortion of the lens in the camera main body 21. More specifically, the third factor is the tendency for optical distortion to increase in the direction of the image periphery.

The fourth factor is camera installation rotation. Camera installation rotation refers to rotation about the optical axis direction that may occur when installing the camera main body 21 onto a pan/tilt rotational platform (i.e., the camera platform 22).

The fifth factor is tilt-dependent error. More specifically, when acquiring images in the horizontal direction (i.e., at a tilt angle of 0°), the pan and tilt coordinates are nearly orthogonal as viewed on the screen 122A. When acquiring images in the vertical direction (i.e., at a tilt angle of 90°), the pan and tilt coordinates become concentric as viewed on the screen 122A. Due to this difference in the shape of the pan and tilt coordinates as viewed on the screen 122A, there is tendency for error to occur to the degree that the tilt angle is large. For example, there exists error at the tilt reference point, wherein a slight tilt angle is exhibited even though the camera platform 22 is nominally horizontal with a tilt angle of 0°. As another example, there also exists tilt drive error. In other words, when driving the tilt angle at 90°, in practice the actual tilt angle may not be 90°, but rather 89° or 91°, for example. When the tilt angle is set to 90°, the center of the screen 122A is also found at a tilt angle of 90°, and thus an object displayed at the center of the screen 122A theoretically remains vertically centered after panning. However, due to the above error, the actual tilt angle is not aligned at 90°, and thus objects appear to rotate to the user.

The sixth factor is pan drive error. Pan drive error refers to error in the rotational angle. For example, even though a nominal rotation of 20° may be applied, in practice the actual rotation might be only 19°.

As described above, the area zoom off-center display phenomenon occurs due to the compound interaction of a variety of factors described above as the first through the sixth factors, with the first factor being displacement from the optical axis center.

Consequently, it is difficult to fully suppress the area zoom off-center display phenomenon by simply using Eqs. 5 and 6, which only consider the first factor. In particular, the area zoom off-center display phenomenon becomes more problematic as the zoom magnification n, in Eq. 4 increases. More specifically, at higher magnifications, the target object Ob becomes increasingly displaced from the center O of the screen 122A, and is ultimately displaced out of the screen 122A entirely.

Consequently, in the present embodiment the area zoom function is configured such that the following is conducted when a given area (i.e., rectangular region) such as that enclosed by the area zoom frame 501 is specified as a sub-area of an image displayed in the predetermined display region of the screen 122A or similar output. First, a limiting magnification is set in advance on the basis of the displacement of the center of the given area before and after conducting an area zoom operation. If the relative zoom magnification computed from the given area exceeds the limiting magnification, then the limiting magnification is adopted as the relative zoom magnification. Herein, the relative zoom magnification refers to the relative magnification that expresses how far the display is zoomed with respect to the current lens magnification (i.e., the current acquisition magnification). In addition, the displacement of the center of the given area before and after conducting an area zoom operation refers to the magnitude of the displacement of the display position of a target object Ob from the display center when the given area is enlarged and displayed. Hereinafter, the above technique will be referred to as the zoom magnification limiting technique.

Figure 11:
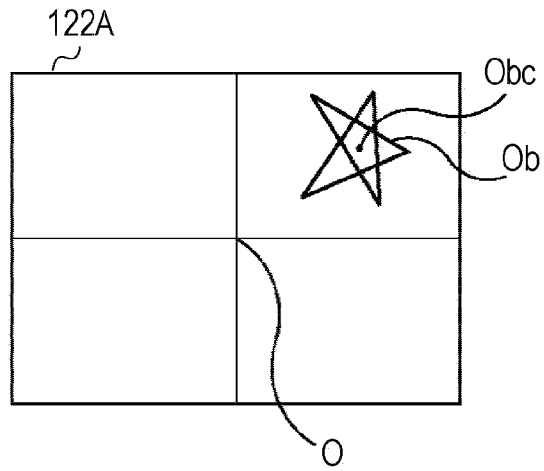
FIG. 11 illustrates an exemplary display image displayed after an area zoom operation, in the case where the zoom magnification limiting technique in accordance with an embodiment of the present invention has been applied.

By adopting the zoom magnification limiting technique, the following is achieved. Even if the area zoom frame 501 is set as shown by way of example in FIG. 8 and an area zoom operation is conducted, the target object Ob is not displayed out of the screen 122A as shown in the display state in FIG. 10, but rather the target object Ob is made to reliably appear within the screen 122A as shown in the display state in FIG. 11. Stated differently, a limiting magnification is set such that the display state becomes like that shown in FIG. 11. In so doing, the target object Ob is no longer lost from sight, even when the user uses the area zoom function. In other words, even if the center $Ob_c$ of the target object Ob is displaced from the center O of the screen 122A after an area zoom, the user is still able to easily view the target object Ob within the screen 122A. As a result, the user is able to easily align the center $Ob_c$ of the target object Ob with the center O of the screen 122A by simply operating the remote apparatus 12 and making small adjustments, such as by clicking the target object Ob using the mouse 121 and causing the display view to move, for example. Herein, the functions realized by such operations are referred to as direct pan and tilt functions.

Hereinafter, the zoom magnification limiting technique will be described in further detail.

The relative zoom magnification that is limited by the zoom magnification limiting technique is herein represented by the symbol Z.

In the present case, the zoom magnification $n_1$ (i.e., the acquisition magnification $n_1$ after modification by an area zoom) is computed using the following Eq. 7 instead of the above Eq. 4. More specifically, in Eq. 7, the current magnification (i.e., the acquisition magnification before modification by an area zoom) is multiplied by the relative zoom magnification Z, with the result being taken to be the zoom magnification $n_1$ that represents the modified acquisition magnification.

$$n_1 = Z \times \text{current lens magnification} \quad (7)$$

Stated differently, in the zoom magnification limiting technique, the relative zoom magnification Z in the non-limiting case (i.e., the relative zoom magnification Z computed on the basis of the proportion of the image enclosed by the area zoom frame 501 with respect to the screen 122A) corresponds to the term (horizontal size of screen area/horizontal size of the area zoom frame) on the right side of the above Eq. 4. Hereinafter, the relative zoom magnification Z computed on the basis of the proportion of the image enclosed by the area zoom frame 501 with respect to the screen 122A will be referred to in particular as the computed relative zoom magnification $Z_r$.

In contrast, the limiting magnification set in advance on the basis of the displacement of the center of the given area before and after conducting an area zoom will be hereinafter referred to in particular as the limiting magnification $Z_{limit}$.

In the present case, when the computed relative zoom magnification $Z_r$ is less than the limiting magnification $Z_{limit}$, the computed relative zoom magnification $Z^r$ is adopted as the relative zoom magnification $Z$ in Eq. 7. In contrast, when the computed relative zoom magnification $Z_r$ exceeds the limiting magnification $Z_{limit}$, the limiting magnification $Z_{limit}$ is adopted as the relative zoom magnification $Z$ in Eq. 7.

In other words, it is possible to rewrite Eq. 7 as the following Eqs. 8 and 9.

$$n_1 Z_r \times \text{current lens magnification } (Z_r \leq Z_{limit}) \quad (8)$$

$$n_1 = Z_{limit} \times \text{current lens magnification } (Z_r > Z_{limit}) \quad (9)$$

The following Eqs. 10 and 11 may also be adopted instead of Eqs. 8 and 9. In this case, a constant k (k<1) is applied to further limit the zoom magnification $n_1$, thereby mitigating the displacement of the target object Ob after an area zoom.

$$n_1 = k \times z_r \times \text{current lens magnification } (Z_r > Z_{limit}) \quad (10)$$

$$n_1 = k \times Z_{limit} \times \text{current lens magnification } (Z_r > Z_{limit}) \quad (11)$$

Herein, the technique itself whereby the limiting magnification $Z_{limit}$ is configured is not particularly limited, so long as applying technique achieves the desired effect of preventing a target object Ob from being displaced out of the screen 122A even after an area zoom. For example, the adopted technique whereby the limiting magnification $Z_{limit}$ is configured may involve the following.

For example, it is favorable to adopt a technique that also accounts for factors such as the third factor causing the area zoom off-center display phenomenon. In such a technique, the limiting magnification $Z_{limit}$ is varied according to the specified position of the area zoom frame 501. More specifically, the limiting magnification $Z_{limit}$ may be varied between the center and the periphery of the screen 122A, for example. Hereinafter, the above technique will be referred to as the zoom position-dependent configuration technique.

As another example, it is favorable to adopt a technique that also accounts for factors such as the fifth factor causing the area zoom off-center display phenomenon. In such a technique, the limiting magnification $Z_{limit}$ is varied according to the tilt angle. More specifically, the limiting magnification $Z_{limit}$ may be varied between the tilt angles of 0° and 90°, for example. Hereinafter, the above technique will be referred to as the tilt angle-dependent configuration technique.

Hereinafter, the zoom position-dependent configuration technique and the tilt angle-dependent configuration technique will be separately described in the above order.

First, a specific example of the zoom position-dependent configuration technique will be described.

Figure 12:
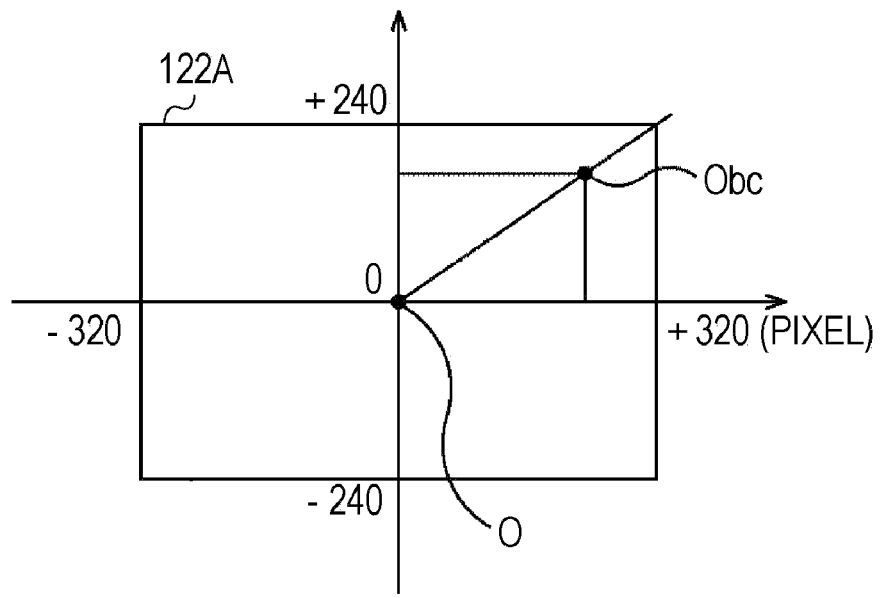
FIG. 12 is a diagram for explaining a technique used to configure the limiting magnification used in the zoom magnification limiting technique in accordance with an embodiment of the present invention.

As shown in FIG. 12, in the zoom position-dependent configuration technique of the present example, a coordinate system is defined having units of 1 pixel and taking the center O of the screen 122A to be the origin, the horizontal direction to be the x axis, and the vertical direction to be the y axis. Using such a coordinate system, the distance is computed from the original O to the center of a specified area zoom frame 501, with the limiting magnification being computed according to the above distance. In the present embodiment as described in the foregoing, the center $Ob_c$ of the target object O and the center of the area zoom frame 501 are aligned. In other words, the area zoom frame 501 is specified so as to be co-incident with the center $Ob_c$ of the target object Ob. For this reason, the example shown in FIG. 12 illustrates the computation of the distance from the origin 0 to the center $Ob_c$ of the target object Ob.

Herein, the distance from the screen center O (i.e., the origin) to the center of the specified area zoom frame 501 (i.e., the center $Ob_c$ of the target object Ob) is represented by the symbol L (herein, a number of pixels), while the limiting magnification that varies according to this distance L is represented in particular as the limiting magnification $Z_L$. In addition, the maximum value of the limiting magnification $Z_{limit}$ is taken to be 32×.

Figure 13:
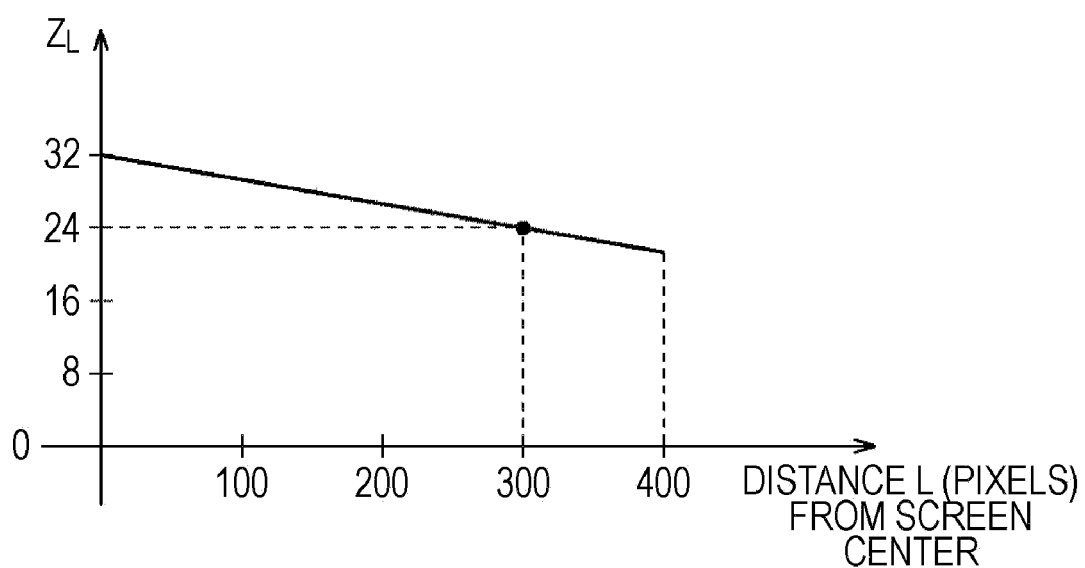
FIG. 13 is a diagram for explaining a technique used to configure the limiting magnification used in the zoom magnification limiting technique in accordance with an embodiment of the present invention.

In this case, the limiting magnification $Z_L$ can be computed according to the graph shown in FIG. 13, for example.

As another example, the center of the specified area zoom frame 501 (i.e., the center $Ob_c$ of the target object Ob) may be expressed as a coordinate set (x, y). The limiting magnification that varies according to distance from the screen center O (i.e., the origin) to the x coordinate (this distance being equal to absolute value |x| of the x coordinate) is referred to in particular as the limiting magnification $Z_x$. Likewise, the limiting magnification that varies according to distance from the screen center O (i.e., the origin) to the y coordinate (this distance being equal to absolute value |y| of the y coordinate) is referred to in particular as the limiting magnification $Z_y$.

Figure 14:
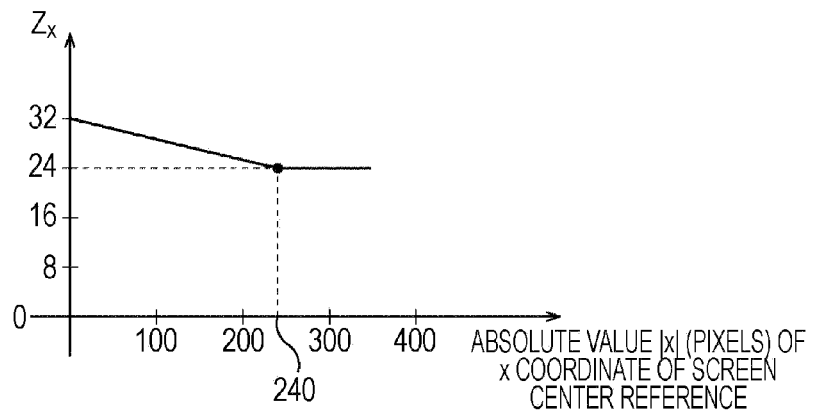
FIG. 14 is a diagram for explaining a technique used to configure the limiting magnification used in the zoom magnification limiting technique in accordance with an embodiment of the present invention.
Figure 15:
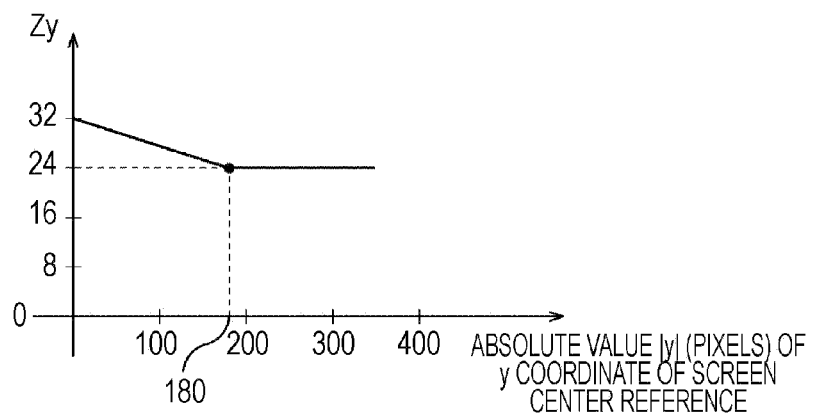
FIG. 15 is a diagram for explaining a technique used to configure the limiting magnification used in the zoom magnification limiting technique in accordance with an embodiment of the present invention.

In this case, the limiting magnifications $Z_x$ and $Z_y$ can be computed according to the graphs shown in FIGS. 14 and 15, respectively.

Figure 16:
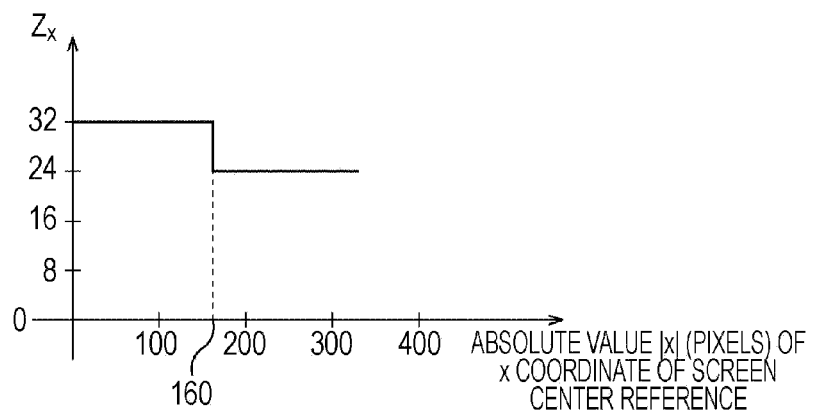
FIG. 16 is a diagram for explaining a technique used to configure the limiting magnification used in the zoom magnification limiting technique in accordance with an embodiment of the present invention.
Figure 17:
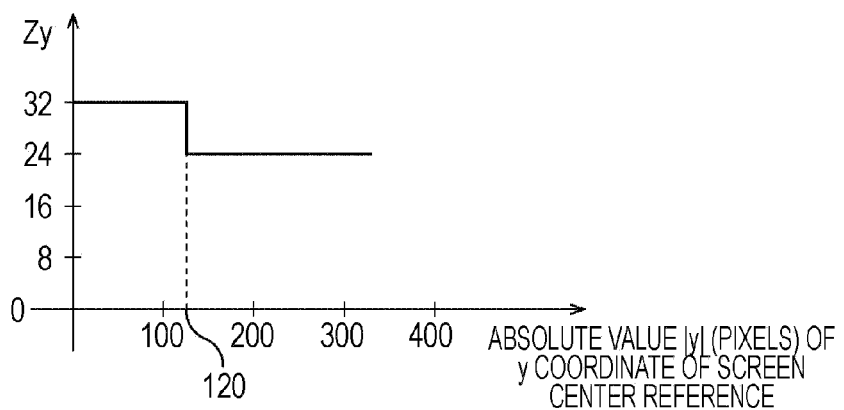
FIG. 17 is a diagram for explaining a technique used to configure the limiting magnification used in the zoom magnification limiting technique in accordance with an embodiment of the present invention.

Alternatively, the limiting magnifications $Z_x$ and $Z_y$ can be computed according to the graphs shown in FIGS. 16 and 17, respectively.

When the zoom position-dependent configuration technique is singularly applied, any one of the limiting magnifications $Z_L$, $Z_x$, and $Z_y$ computed as above may be adopted as the final limiting magnification $Z_{limit}$.

The above thus describes a specific example of the zoom-position-dependent configuration technique.

A specific example of the tilt angle-dependent configuration technique will now be described.

Herein, the tilt angle is represented as $\theta_t$ (degrees), while the limiting magnification that varies according to the absolute value $|\theta_t|$ (degrees) is represented in particular as the limiting magnification $Z_T$. In addition, the maximum value of the limiting magnification $Z_{limit}$ is taken to be 32×.

Figure 18:
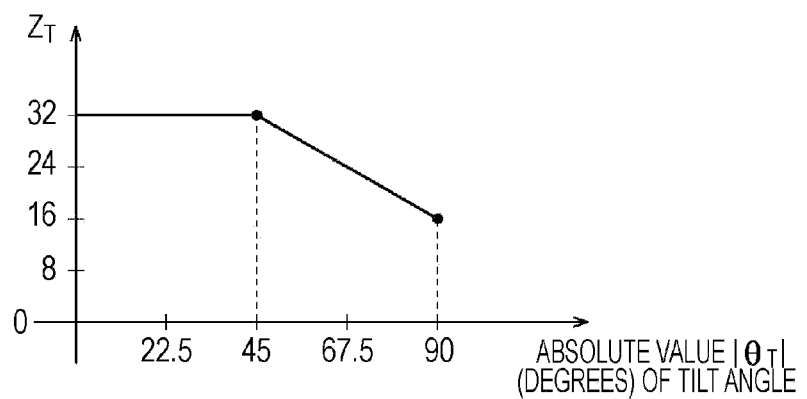
FIG. 18 is a diagram for explaining a technique used to configure the limiting magnification used in the zoom magnification limiting technique in accordance with an embodiment of the present invention.

In this case, the limiting magnification $Z_T$ can be computed according to the graph shown by way of example in FIG. 18.

Figure 19:
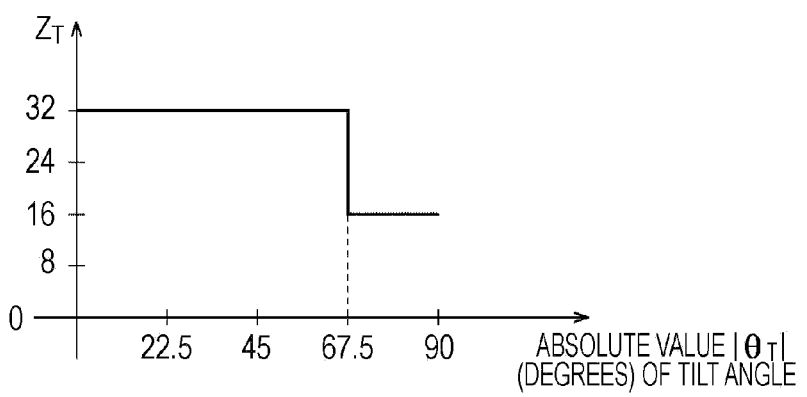
FIG. 19 is a diagram for explaining a technique used to configure the limiting magnification used in the zoom magnification limiting technique in accordance with an embodiment of the present invention.

Alternatively, the limiting magnification $Z_T$ can be computed according to the graph shown by way of example in FIG. 19.

When the tilt angle-dependent configuration technique is singularly applied, the limiting magnification $Z_T$ computed as above may be adopted as the final limiting magnification $Z_{limit}$.

Thus, as described above, either the zoom position-dependent configuration technique or the tilt angle-dependent configuration technique may be singularly adopted as the technique for configuring the limiting magnification $Z_{limit}$. However, it is furthermore possible to adopt a technique that combines both the zoom position-dependent configuration technique and the tilt angle-dependent configuration technique for use as the technique for configuring the limiting magnification $Z_{limit}$. Hereinafter, a specific example of such a technique for configuring the limiting magnification $Z_{limit}$ by combining the zoom position-dependent configuration technique and the tilt-angle configuration technique will be described.

In the present example, the combined technique is configured such that a limiting magnification according to the zoom position-dependent configuration technique as well as a limiting magnification according to the tilt angle-dependent configuration technique are first computed separately. By subsequently performing predetermined computations using the resulting two limiting magnifications, the final limiting magnification $Z_{limit}$ is computed.

For example, a limiting magnification $Z_L$ computed according to the graph shown in FIG. 13 and a limiting magnification $Z_T$ computed according to the graph shown in FIG. 18 may be substituted into the following Eq. 13. The computed result of Eq. 13 may then be set as the final limiting magnification $Z_{limit}$.

$$Z_{limit} = Z_T \times (Z_L/32) \quad (12)$$

The graph shown in FIG. 18 can be expressed ultimately as the following Eqs. 13 and 14. In other words, the limiting magnification $Z_T$ that is substituted into Eq. 12 can be computed according to the following Eqs. 13 and 14.

$$Z_T = 32 (|\theta hd\, t| \leq 45°) \quad (13)$$

$$Z_T = 32 - \{16 \times (|\theta_t| - 45)/45\}(45° < |\theta_{t\oplus} \leq 90°) \quad (14)$$

In addition, the graph shown in FIG. 13 can be expressed ultimately as the following Eq. 15. In other words, the limiting magnification $Z_L$ that is substituted into Eq. 12 can be computed according to the following Eq. 15.

$$Z_L = 32 - \{(8 \times L)/300\} \quad (15)$$

As another example, the limiting magnification $Z_x$ computed according to the graph shown in FIG. 14, the limiting magnification $Z_y$ computed according to the graph shown in FIG. 15, and the limiting magnification $Z_T$ computed according to the graph shown in FIG. 18 may be substituted into the following Eq. 16. The computed result may then be set as the final limiting magnification $Z_{limit}$.

$$Z_{limit} = \min(Z_x, Z_y, Z_T) \quad (16)$$

In Eq. 16, the symbol m( ) represents a function that selects and outputs the minimum value among the plurality of values enclosed in parentheses.

As another example, the limiting magnification $Z_x$ computed according to the graph shown in FIG. 16, the limiting magnification $Z_y$ computed according to the graph shown in FIG. 17, and the limiting magnification $Z_T$ computed according to the graph shown in FIG. 19 may be substituted into the above Eq. 16. The computed result may then be set as the final limiting magnification $Z_{limit}$.

The foregoing thus describes the zoom magnification limiting technique.

Since the zoom magnification limiting technique and the technique used to compensate the pan angle $\theta_p$ and the tilt angle $\theta_t$ using the above Eqs. 5 and 6 (hereinafter referred to as the pan/tilt angle compensation technique) are respectively independent techniques, the above techniques may be adopted singly or in combination in order to realize the area zoom function.

As a specific example, in the case where both the zoom magnification limiting technique and the pan/tilt angle compensation technique are adopted, the angle of the camera platform 22 may be controlled using a pan angle $\theta_p$ and a tilt angle $\theta_t$ computed according to Eqs. 5 and 6, as well as a zoom magnification $n_1$ computed according to Eqs. 8 and 9 or Eqs. 10 and 11.

As another example, in the case where the zoom magnification limiting technique is adopted singly without adopting the pan/tilt angle compensation technique, the angle of the camera platform 22 may be controlled using a pan angle $\theta_p$ and a tilt angle $\theta_t$ computed according to Eqs. 2 and 3, as well as a zoom magnification $n_1$ computed according to Eqs. 8 and 9 or Eqs. 10 and 11.

As another example, in the case where the pan/tilt angle compensation technique is adopted singly without adopting the zoom magnification limiting technique, the angle of the camera platform 22 may be controlled using a pan angle $\theta_p$ and a tilt angle $\theta_t$ computed according to Eqs. 5 and 6, as well as a zoom magnification $n_1$ computed according to Eq. 4.

In principal, the zoom magnification limiting technique and the pan/tilt angle compensation technique are respectively applied one time for a single area zoom.

More specifically, if an area zoom frame 501 is set again after applying an area zoom for the Pth iteration (wherein P is an integer greater than or equal to 1), then a subsequent iteration (P+1) of the area zoom is applied. In the subsequent iteration (P+1) of the area zoom, a pan angle $\theta_p$, a tilt angle $\theta_t$, and a zoom magnification $n_1$ are re-computed independently of the values for the Pth iteration. For example, when evaluating Eq. 8 or 9 for the subsequent iteration (P+1), the current lens magnification is set equal to the zoom magnification $n_1$ obtained as a result of evaluating Eq. 8 or 9 for the Pth iteration.

Consequently, if the area zoom is repeated multiple times, then the zoom magnification $n_1$ obtained as a result of evaluating Eq. 8 or 9 may eventually exceed the maximum magnification determined by the mechanical limits of the camera main body 21. In such a case, the maximum magnification is obviously adopted as the zoom magnification. In other words, the limiting magnification $Z_{limit}$ used in the above equations such as Eq. 9 differs from the maximum magnification determined by the mechanical limits of the camera main body 21.

In this way, it is possible to suitably conduct area zoom operations by applying a zoom magnification limiting technique and/or a pan/tilt compensation technique.

It should be appreciated that the specific numerical values used in the foregoing for quantities such as screen size (in pixels) and angles were given by way of example, and the present invention is not limited thereto. In addition, to facilitate understanding in the description of the area zoom in the embodiment described above, the pan/tilt coordinates were described as being orthogonal as viewed on the screen. However, as described above, the pan/tilt coordinates become curved when viewed on the screen as the tilt angle increases. In such regions of large tilt angles, the pan angle and the tilt angle are no longer simply calculated proportionally from the angular field of view and the number of pixels. However, in such cases it is still possible to apply preprocessing to improve the center position of the area zoom frame by compensating the horizontal error $\Delta x$ and the vertical error $\Delta y$ to be actually applied. In addition, although the present embodiment was primarily described taking the example of an imaging apparatus constituting a network camera, it is also possible to apply the present embodiment to a configuration wherein an imaging apparatus and a monitor are directly connected without an interposed network.

In the case where the foregoing series of processes are executed by means of software, the program constituting such software may be installed over a network or from a computer-readable recording medium onto a computer built into dedicated hardware, or alternatively, onto a device such as a general personal computer capable of executing various functions by installing various programs thereon.

The computer-readable recording medium may be realized as the removable media 111 shown in FIG. 3 and distributed in order to provide users with the program. The removable media 111 storing the program may be a magnetic disk (such as a floppy disk), an optical disc (such as a CD-ROM (Compact Disc read-only memory) or DVD (Digital Versatile Disc)), a magneto-optical disk (such as an MD (MiniDisc)), or semiconductor memory. Alternatively, users may be provided with the computer-readable recording medium already built into the apparatus itself, the program being stored in the non-volatile memory 27 shown in FIG. 2, the ROM 102 shown in FIG. 3, or on a hard disk included in the storage unit 108 shown in FIG. 3.

In addition, in the present specification, the processing steps specified by the program stored on the computer-readable recording medium may of course be executed in a time series following the order described in the foregoing, but in addition, the processing steps may also executed in parallel or individually and without strictly being processed in a time series.

In the foregoing embodiment, the relative zoom magnification Z was computed on the basis of the proportion of the area enclosed by the area zoom frame 501 with respect to the entire screen 122A. However, the present invention is not limited to the above. For example, the relative zoom magnification Z may also be computed as a ratio of the dimensions of the screen 122A with respect to the area zoom frame 501.

It should be understood by those skilled in the art that various modifications, combinations, sub-combinations and alterations may occur depending on design requirements and other factors insofar as they are within the scope of the appended claims or the equivalents thereof.

What is claimed is:

1. An apparatus, comprising:
a controller configured to
conduct an area zoom control such that, when a given area is specified as a sub-area of a display region displaying a first image acquired by an imaging unit at a current acquisition magnification and a current acquisition angle, the imaging unit acquires a second image of the given area at a modified acquisition magnification and a modified acquisition angle, and
determine the modified acquisition magnification, at least in part, by comparing a ratio to a limiting magnification, the ratio being of dimensions of the display region with respect to dimensions of the given area, the limiting magnification being based, at least in part, on an amount by which a center of the given area would be displaced from a center of the display region if the limiting magnification were applied,
wherein
the modified acquisition magnification is obtained as a result of multiplying the current acquisition magnification by a relative zoom magnification, and
the controller is configured such that
when the ratio is larger than the limiting magnification, the limiting magnification is adopted as the relative zoom magnification, and
when the ratio is smaller than the limiting magnification, the ratio is adopted as the relative zoom magnification.

2. The apparatus according to claim 1, wherein the controller is further configured to vary the limiting magnification according to a position of the given area in the display region.

3. The apparatus according to claim 1, wherein the controller is further configured to conduct a second area zoom control, after conducting the area zoom control by adopting the limiting magnification as the relative zoom magnification, such that the imaging unit acquires a third image at an acquisition magnification exceeding the modified acquisition magnification.

4. The apparatus according to claim 1, wherein, given a case wherein a first area is specified as a sub-area of the display region, if the first area is geometrically similar to the display region, then the first area is taken to be the given area.

5. The apparatus according to claim 1, wherein, given a case wherein a second area is specified as a sub-area of the display region, if the second area is geometrically dissimilar to the display region, then an area that both contains the second area and is geometrically similar to the display region is taken to be the given area.

6. The apparatus according to claim 1, further comprising the imaging unit configured to acquire an image at an acquisition magnification and an acquisition angle.

7. A method executed by an apparatus, the method comprising:
conducting an area zoom control such that, when a given area is specified as a sub-area of a display region displaying a first image acquired by an imaging unit at a current acquisition magnification and a current acquisition angle, the imaging unit acquires a second image of the given area at a modified acquisition magnification and a modified acquisition angle,
determining the modified acquisition magnification, at least in part, by comparing a ratio to a limiting magnification, the ratio being of dimensions of the display region with respect to dimensions of the given area, the limiting magnification being based, at least in part, on an amount by which a center of the given area would be displaced from a center of the display region if the limiting magnification were applied,
wherein
the modified acquisition magnification is obtained as a result of multiplying the current acquisition magnification by a relative zoom magnification,
when the ratio is larger than the limiting magnification, the limiting magnification is adopted as the relative zoom magnification, and
when the ratio is smaller than the limiting magnification, the ratio is adopted as the relative zoom magnification.

8. A non-transitory computer-readable recording medium storing a program that, when executed by a computer configured to control an imaging apparatus, causes the computer to execute a method comprising:
controlling the imaging apparatus by conducting an area zoom control such that, when a given area is specified as a sub-area of a display region displaying a first image acquired by the imaging apparatus at a current acquisition magnification and a current acquisition angle, the imaging apparatus acquires a second image of the given area at a modified acquisition magnification and a modified acquisition angle,
determining the modified acquisition magnification, at least in part, by comparing a ratio to a limiting magnification, the ratio being of dimensions of the display region with respect to dimensions of the given area, the limiting magnification being based, at least in part, on an amount by which a center of the given area would be displaced from a center of the display region if the limiting magnification were applied,
wherein
the modified acquisition magnification is obtained as a result of multiplying the current acquisition magnification by a relative zoom magnification,
when the ratio is larger than the limiting magnification, the limiting magnification is adopted as the relative zoom magnification, and
when the ratio is smaller than the limiting magnification, the ratio is adopted as the relative zoom magnification.

9. An apparatus, comprising:
a controller configured to
- obtain a specification of a given area as a sub-area of a display region, the display region displaying a first image acquired by an imaging unit at a current acquisition magnification and a current acquisition angle,
- compute, in a computing act, a modified acquisition magnification and a modified acquisition angle, the modified acquisition angle based at least in part on a difference between the modified acquisition magnification and the current acquisition magnification, and
- conduct an area zoom control, based on the modified acquisition magnification and the modified acquisition angle computed in the computing act, such that the imaging unit acquires a second image of the given area at the modified acquisition magnification and the modified acquisition angle, wherein the modified acquisition angle is computed, in the computing act, based at least in part on displacement data indicating a distance by which a center of an imaged object becomes displaced from a center of the display region when the imaging unit adjusts an acquisition magnification from a first setting to a second setting.

10. The apparatus according to claim 9, wherein the modified acquisition angle is computed, in the computing act, based at least in part on a position of a center of the given area with respect to a center of the display region.

11. The apparatus according to claim 9, wherein the displacement data depends on a distance by which an optical axis of a zoom lens of the imaging unit is displaced from a center of an imaging area of an imaging element of the imaging unit.

12. The apparatus according to claim 9, wherein:
computing, in the computing act, the modified acquisition magnification comprises multiplying the current acquisition magnification by a relative zoom magnification; and
the controller is further configured to:
- determine the modified acquisition magnification, at least in part, by comparing a ratio to a limiting magnification, the ratio being of dimensions of the display region with respect to dimensions of the given area, the limiting magnification being based, at least in part, on an amount by which a center of the given area would be displaced from a center of the display region if the limiting magnification were applied,
- to adopt the limiting magnification as the relative zoom magnification when a ratio of dimensions of the display region with respect to dimensions of the given area is larger than the limiting magnification, and
- to adopt the ratio as the relative zoom magnification when the ratio of the dimensions of the display region with respect to the dimensions of the given area is smaller than the limiting magnification.

13. The apparatus according to claim 9, wherein conducting the area zoom control comprises conducting the area zoom control subsequent to computing, in the computing act, the modified acquisition magnification and the modified acquisition angle.

14. The apparatus according to claim 9, wherein the controller is further configured to vary the limiting magnification according to a position of the given area in the display region.

15. The apparatus according to claim 9, wherein the controller is further configured to conduct a second area zoom control, after conducting the area zoom control in which the limiting magnification was adopted as the relative zoom magnification, such that the imaging unit acquires a third image at an acquisition magnification exceeding the modified acquisition magnification.

16. The apparatus according to claim 9, wherein, if a first area is specified as a sub-area of the display region and the first area is geometrically similar to the display region, then the first area is taken to be the given area.

17. The apparatus according to claim 9, wherein, if a second area is specified as a sub-area of the display region and the second area is geometrically dissimilar to the display region, then an area that both contains the second area and is geometrically similar to the display region is taken to be the given area.

* * * * *